Figure 1:
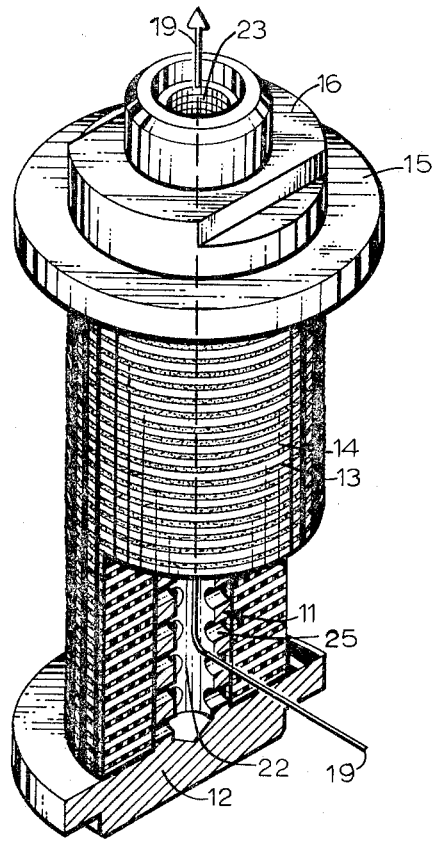

May 16, 1967   H. W. SCHMIDLI   3,319,795

FLUID FILTER WITH STACKED FILTERING ELEMENTS

Filed July 11, 1963

INVENTOR.
HEINZ W. SCHMIDLI
BY
*Edward A. Sokolski*
ATTORNEY

United States Patent Office 3,319,795
Patented May 16, 1967

3,319,795
FLUID FILTER WITH STACKED FILTERING ELEMENTS
Heinz W. Schmidli, Redondo Beach, Calif.
(37 Marimar St., Thousand Oaks, Calif. 91360)
Filed July 11, 1963, Ser. No. 294,424
4 Claims. (Cl. 210—457)

This application relates to a fluid filter and more particularly to such a device capable of extremely fine filtering action.

In the precision applications that are encountered in the aero-space industry, it is often necessary to provide a filter in a fuel system or a hydraulic or pneumatic control system which must meet extremely rigorous qualifications. In such situations, there is not only a requirement for extremely fine filtering action, but also that the filter be able to withstand the action of extremely corrosive fluids and operate efficiently and reliably for long periods of time.

To meet these demands, filters utilizing stainless steel wire meshes and molded powder filters have been utilized. These filter units are often joined together by epoxy bonding and brazing techniques. In wire mesh devices of the prior art, it has been possible to achieve filtering action of the order of 15 microns absolute. This filtering limit is imposed by the practical inability to utilize wire of less than .0015 inch diameter in weaving the mesh. To achieve even a 15 micron absolute filtering action, 2300 wires of .0015 inch diameter wire must be compressed into 1 inch of space with considerable force and overlay of the wires.

While wire mesh filters having capabilities of the order of 15 microns are suitable for many applications, there are many situations where such filtering is inadequate to meet application requirements. While there has been a great demand in precision applications for a non corrosive filter capable of filtering action of the order of 5 microns absolute, no such filter has been available prior to development of the device of this invention.

The device of this invention overcomes the limitations of prior art filter devices and provides a simple, highly reliable filter capable of filtering action of the order of 3 microns absolute. The device of the invention has no bonded or brazed pieces and is very easy to assemble and disassemble for cleaning or replacement of filter elements. It is further fabricated so that there are no elements therein which are subject to corrosion by even the most extremely corrosive fluids.

In the device of the invention, the improved end result is achieved by utilizing a plurality of mesh filter elements which surround a hollow core member in concentric relationship therewith. Each such filter element is sandwiched between a pair of flat plate elements which are similarly concentric with the core member. Such filter and plate elements are stacked until they substantially fill up the core member. Means are provided for adjustably compressing the broad surfaces of the plate elements against the broad surfaces of the filter elements. The filter action is achieved by placing the filter so that the fluid flow is along the radii of the plate and filter elements between the flat surfaces of the plate elements and the irregular surfaces of the filter elements. It has been found that the irregularities in the surfaces of the fine wire mesh elements are such as to form a tortuous path for the fluid flow between such surfaces and the flat plate element surfaces such that filtering action down to less than 3 microns absolute can be achieved. Means are provided for adjustably compressing the broad surfaces of the plate elements against the broad surfaces of the filter elements to achieve the desired filtering action, finer filtering action being achieved when the surfaces are more tightly compressed.

It is therefore an object of this invention to provide an improved filtering unit.

It is a further object of this invention to provide a filter unit capable of resisting corrosive fluids which can achieve finer filtering action than prior art devices.

It is still another object of this invention to provide an improved filter device in which the filtering action is achieved between the broad surfaces of a series of flat plates and mesh filter elements sandwiched therebetween.

It is still a further object of this invention to facilitate the filtering of fluids utilized in precision applications.

Figure 2:
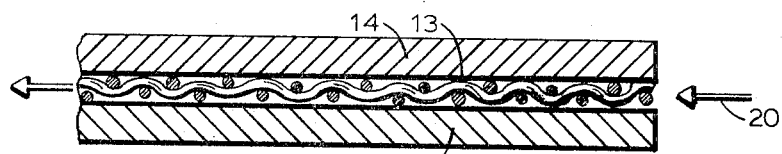

Other objects of this invention will become apparent from the following description taken in connection with the accompanying drawings of which FIG. 1 is a perspective view of a preferred embodiment of the device of the invention with partial cutaway section and FIG. 2 is a cross sectional view illustrating how the filtering action is achieved in the device of the invention.

Referring now to FIG. 1, a preferred embodiment of the device of the invention is illustrated. Hollow core member 11 which may be fabricated of stainless steel is fixedly attached at one end thereof to end plate 12. Core member 11 has a passageway 22 running through the longitudinal extent thereof which terminates at the other end thereof in an aperture 23. The end of passageway 22 which terminates at end plate 12 is sealed off by the end plate.

Core member 11 has a plurality of apertures 25 in the walls thereof running substantially normal to the longitudinal axis of the core member. Stacked alternately on core member 11 are a plurality of wire mesh filter elements 13 and flat plate elements 14. These washer-shaped filter elements and flat plate elements surround the core member 11 in concentric relationship therewith. Filter elements 13 are preferably fabricated of stainless steel, the wire elements thereof being tightly meshed. The flat washer plate elements 14 are preferably of smooth hard stainless steel. The mesh and plate elements are alternately stacked to substantially fill up the entire core. Load bearing washer 15 completes the stack. On top of load bearing washer 15, is a torque nut assembly 16 which threadably engages the top portion of the core member and is utilized to tighten the stack by compressing load bearing washer 15 against the mesh filter elements and the flat plates. The fineness of the filtering action of the filter can be adjusted within a moderate range by tightening down torque nut assembly 16 as desired.

The fluid flow through the filter may either be as indicated by arrow 19, from the outside of the stacked filter mesh and plate elements through apertures 25 to passageway 22 in the core member and out through aperture 23; or the fluid may come in through aperture 23 and flow out between the filter and plate elements. Normally, however a fluid flow path from the outside of the filter and plate elements to the core member is to be preferred because of the large media area exposed to the fluid with this type of flow.

Referring now to FIG. 2, the fluid flow in the device of the invention is illustrated. FIG. 2 is expanded many times over the normal size of typical units to better illustrate the fluid flow. The preferred flow path is in the direction of arrow 20 from the outside of the filter element 13 and the plate elements 14 between which such filter elements are sandwiched. The mesh element 13 presents irregular top and bottom surfaces to the flat plates 14 by virtue of its weave. The fluid flow is through the irregular spaces between the plate and filter elements which are produced by virtue of the irregular contour of the faces of the filter elements. This results in a tortuous fluid flow path between the flat surfaces of the plate elements and the irregular surfaces of the mesh filter elements.

Cleaning of the filter device can be accomplished by merely slacking off torque nut assembly 16 and thus allowing the stack to become loose. Back flushing or ultrasonics can then be utilized to remove the dirt.

The filter defficiency can be controlled by tightening and loosening torque nut assembly 16 to achieve the desired end result. The unit can be fabricated entirely of stainless steel and thus can be made compatible with the most corrosive type fluids now in use in fuel and hydraulic and pneumatic systems. Units of the device of the invention have been found to be capable of withstanding collapse pressures in the order of 10,000 p.s.i.g. without deformation.

The device of this invention thus provides a simple yet highly efficient filter element capable of extremely fine filter action. The unit can be fabricated entirely of materials that are corrosive resistant and can readily be assembled and disassembled. In addition, the unit can readily be cleaned without extensive disassembly thereof.

While the device of the invention has been described and illustrated in detail, it is to be clearly understood that this is intended by way of illustration and example only and is not to be taken by way of limitation, the spirit and scope of this invention being limited only by the terms of the following claims.

I claim:
1. In a fluid filter,
a plurality of thin washer-shaped wire mesh filter elements,
a plurality of flat plate washer elements,
an elongated centrally located cylindrical hollow core member having a plurality of apertures in the side walls thereof and a passageway running through the longitudinal extent thereof,
said filter elements and said flat washer elements being alternately stacked on said core member in concentric relationship therewith to substantially fill up said core member, said mesh filter elements and said flat washer elements being fabricated of a non-corrosive metal such that said filter elements are not substantially deformed by axial assembly pressure, said filter elements in their installed position being capable of withstanding high fluid pressures radially without deforming,
a load washer mounted on said core member in concentricity therewith on top of said stacked filter and washer elements, and
a torque nut assembly for adjusting the compression of said washer and filter elements, said torque nut assembly being positioned adjacent to said load washer and threadably engaging an end of said core member.

2. The filter as recited in claim 1 wherein the apertures in the side walls of said core member are spaced along the entire longitudinal extent thereof.

3. In a fluid filter,
a plurality of thin washer-shaped wire mesh filter elements,
a plurality of flat washer elements,
an elongated centrally located hollow core member having a plurality of apertures in the side walls thereof and a passageway running through the longitudinal extent thereof,
an end plate fixedly attached to one end of said core member, said end plate sealing off one end of said passageway, the other end of said core member having an aperture formed therein for passing fluid,
said filter elements and said flat washer elements being alternately stacked on said core member in concentric relationship therewith to substantially fill up said core member, said mesh filter elements and said flat washer elements being fabricated of a non-corrosive metal such that said filter elements are not substantially deformed by axial assembly pressure, said filter elements in their installed position being capable of withstanding high fluid pressures radially without deforming,
a load washer mounted on said core member in concentricity therewith on top of said stacked filter and washer elements near the other end of said core member, and
torque nut assembly means for adjusting the compression of said washer and filter elements against each other.

4. The filter as recited in claim 3 wherein said torque nut assembly means includes a torque nut which threadably engages the other end of said core member.

References Cited by the Examiner

UNITED STATES PATENTS

| 1,061,928 | 5/1913 | Seavey | 210—351 |
| 1,677,892 | 7/1928 | Herbert et al. | 210—488 |
| 2,553,567 | 5/1951 | Fette | 210—492 X |
| 2,583,423 | 1/1952 | Hallinan | 210—488 X |
| 2,826,309 | 3/1958 | Forman et al. | 210—488 |
| 3,132,099 | 5/1964 | Eilhauer | 210—499 X |

FOREIGN PATENTS

| 1,044,349 | 6/1953 | France. |

REUBEN FRIEDMAN, *Primary Examiner.*

F. W. MEDLEY, *Assistant Examiner.*